(12) United States Patent
Hayakawa et al.

(10) Patent No.: US 12,410,305 B2
(45) Date of Patent: Sep. 9, 2025

(54) CELLULOSE COMPOSITION, CELLULOSE MOLDED BODY, AND METHOD FOR PRODUCING CELLULOSE COMPOSITION

(71) Applicant: SHIN-ETSU CHEMICAL CO., LTD., Tokyo (JP)

(72) Inventors: Kazuhisa Hayakawa, Joetsu (JP); Takane Sudo, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1062 days.

(21) Appl. No.: 17/273,104

(22) PCT Filed: Aug. 20, 2019

(86) PCT No.: PCT/JP2019/032351
§ 371 (c)(1),
(2) Date: Mar. 3, 2021

(87) PCT Pub. No.: WO2020/049995
PCT Pub. Date: Mar. 12, 2020

(65) Prior Publication Data
US 2021/0309836 A1  Oct. 7, 2021

(30) Foreign Application Priority Data
Sep. 4, 2018 (JP) ................................ 2018-165160

(51) Int. Cl.
*C08L 1/28* (2006.01)
*C08J 3/00* (2006.01)
*C08L 1/02* (2006.01)
*C08L 1/04* (2006.01)

(52) U.S. Cl.
CPC ............... *C08L 1/284* (2013.01); *C08J 3/005* (2013.01); *C08L 1/02* (2013.01); *C08L 1/04* (2013.01); *C08J 2301/02* (2013.01); *C08J 2301/28* (2013.01); *C08J 2401/28* (2013.01)

(58) Field of Classification Search
CPC .... C08L 1/284; C08L 1/02; C08L 1/04; C08J 3/005; C08J 2301/02; C08J 2301/28; C08J 2401/28

USPC ........................................................ 106/172.1
See application file for complete search history.

(56) References Cited

U.S. PATENT DOCUMENTS

| | | | |
|---|---|---|---|
| 4,594,108 A * | 6/1986 | Greminger, Jr. .......... | C08L 1/28 106/162.82 |
| 9,826,763 B2 * | 11/2017 | Tan ......................... | A61K 8/731 |
| 2005/0244483 A1 | 11/2005 | Maruyama | |
| 2011/0290694 A1 | 12/2011 | Fuisz et al. | |

FOREIGN PATENT DOCUMENTS

| | | |
|---|---|---|
| JP | 58-90507 A | 5/1983 |
| JP | 2005-336177 A | 12/2005 |
| JP | 2013-533851 A | 8/2013 |
| JP | 2016-79311 A | 5/2016 |
| JP | 2017-25338 A | 2/2017 |

OTHER PUBLICATIONS

International Search Report, issued in PCT/JP2019/032351, PCT/ISA/210, dated Oct. 21, 2019.
Written Opinion of the International Searching Authority, issued in PCT/JP2019/032351, PCT/ISA/237, dated Oct. 21, 2019.

\* cited by examiner

*Primary Examiner* — Coris Fung
*Assistant Examiner* — Catriona M Corallo
(74) *Attorney, Agent, or Firm* — Birch, Stewart, Kolasch & Birch, LLP

(57) ABSTRACT

Disclosed is a cellulose composition including: (A) a water-soluble cellulose ether, (B) water-insoluble cellulose particles and (C) water. The cellulose composition may serve as a novel biomass material which uses biodegradable cellulose that places little burden on the environment, and exhibits excellent shape retention properties. The cellulose composition may include (A) 100 parts by weight of the water-soluble cellulose ether, (B) 30 to 150 parts by weight of the water-insoluble cellulose particles, and (C) 300 to 1,000 parts by weight of water.

14 Claims, No Drawings

CELLULOSE COMPOSITION, CELLULOSE MOLDED BODY, AND METHOD FOR PRODUCING CELLULOSE COMPOSITION

TECHNICAL FIELD

The present invention relates to a cellulose composition, a cellulose formed body and a method for producing a cellulose composition.

BACKGROUND ART

In recent years, there has been much interest in biomass materials from the standpoint of environmental protection. It has been proposed that efforts be made to curb environmental degradation by replacing a portion of petroleum-based polymeric materials such as thermoplastic resins and thermoset resins with biomass materials, in this way preventing the depletion of petroleum resources that serve as the feedstock for petroleum-based polymeric materials and increasing the biodegradability of petroleum-based polymeric materials. The addition of biomass materials in order to improve the quality of petroleum-based polymeric materials utilized in various industries, including the automotive and the office automation and electrical/electronic fields, has also been studied.

For example, JP-A 2016-079311 (Patent Document 1) discloses a polyolefin resin composition which is characterized by including from 0.2 to 30 parts by weight of (C) a terpene phenolic compound per 100 parts by weight of a resin mixture of (A) from 1 to 60 wt % of cellulose nanofibers having an average fineness of 10 to 200 nm obtained by fibrillating polysaccharide with jets of high-pressure water and (B) from 40 to 99 wt % of a polyolefin resin.

JP-A 2017-025338 (Patent Document 2) describes a fiber-reinforced resin composition which includes (A) chemically modified cellulose nanofibers and (B) a thermoplastic resin, wherein the chemically modified cellulose nanofibers and the thermoplastic resin satisfy the following conditions: (a) the ratio R ($SP_{cnf}/SP_{pOL}$) of the solubility parameter $SP_{cnf}$ of the chemically modified cellulose nanofibers (A) to the solubility parameter $SP_{pOL}$ of the thermoplastic resin (B) is in the range of 0.87 to 1.88, and (b) the chemically modified cellulose nanofibers (A) have a degree of crystallization of at least 42.7%.

However, in Patent Documents 1 and 2, the strength is maintained by using a polyolefin resin or the like obtained from petroleum resources as the thermoplastic resin, and so these resin compositions have an inferior biodegradability.

Given that cellulose is the main component of plant cell walls and the most abundant polymer on earth, it is familiar as a biomass material (a renewable material that is an organic resource originating from organisms, except for fossil resources). Although applications for this cellulose include papermaking materials, lumber products, cotton fiber garments, food additives, pharmaceuticals, cosmetics, tablet coatings, biodegradable plastic additives, synthetic silk feedstock, photographic film and filter materials, one would be hard-pressed to say that it is currently being put to full use.

PRIOR ART DOCUMENTS

Patent Documents

Patent Document 1: JP-A 2016-079311
Patent Document 2: JP-A 2017-025338

SUMMARY OF INVENTION

Technical Problem

The present invention was arrived at in light of the above circumstances. The objects of the invention are to provide a cellulose composition of excellent shape retention which is a novel, cellulose-utilizing biomass material that has a low environmental impact and is biodegradable, a cellulose formed body, and a method for producing the cellulose composition.

Solution to Problem

Accordingly, the invention provides the following cellulose composition, cellulose formed body and method for producing a cellulose composition.

1.
    A cellulose composition which includes:
    (A) a water-soluble cellulose ether,
    (B) water-insoluble cellulose particles, and
    (C) water.

2.
    The cellulose composition of 1 above which includes from 30 to 150 parts by weight of component (B) and from 300 to 1,000 parts by weight of component (C) per 100 parts by weight of component (A).

3.
    The cellulose composition of 1 or 2 above, wherein the water-insoluble cellulose particles serving as component (B) have a volume-based mean particle size as determined by wet laser diffraction of from 0.017 to 200 μm.

4.
    The cellulose composition of any of 1 to 3 above, wherein the volume fraction in component (B) of water-insoluble cellulose particles having an effective particle size as determined by wet laser diffraction of from 0.017 to 1 μm is at least 0.3%.

5.
    The cellulose composition of any of 1 to 4 above, wherein component (B) is a low-substituted hydroxypropylcellulose having a hydroxypropoxy molar substitution (MS) of from 0.1 to 0.4.

6.
    The cellulose composition of any of 1 to 5 above, wherein component (A) is at least one selected from the group consisting of hydroxypropylmethylcellulose, hydroxyethylmethylcellulose and methylcellulose.

7.
    A cellulose formed body obtained by forming and drying the cellulose composition of any of 1 to 6 above.

8.
    A method for producing a cellulose composition, which method includes the step of mixing together (a) a water-soluble cellulose ether starting powder, (b) a water-insoluble cellulose particle starting powder and (c) water to obtain a cellulose composition.

9.
The cellulose composition production method of 8 above, wherein the mixing step is kneading/extrusion treatment that continuously carries out kneading treatment and extrusion treatment.

10.
The cellulose composition production method of 8 or 9 above, wherein the mixing step is carried out after carrying out the step of preparing a water-insoluble cellulose particle dispersion by mixing together (b) the water-insoluble cellulose particle starting powder and (c) water, the step of subjecting the water-insoluble cellulose particle dispersion to grinding treatment that pulverizes the water-insoluble cellulose particles and the step of adding (a) the water-soluble cellulose ether starting powder to the water-insoluble cellulose particle dispersion following grinding treatment.

11.
The cellulose composition production method of any of 8 to 10 above, wherein the ingredients are included in amounts of 100 parts by weight of (a) water-soluble cellulose ether starting powder, from 30 to 150 parts by weight of (b) water-insoluble cellulose particle starting powder and from 300 to 1,000 parts by weight of (c) water.

12.
The cellulose composition production method of any of 8 to 11 above, wherein the cellulose composition includes water-insoluble cellulose particles having a volume-based mean particle size as measured by wet laser diffraction of from 0.017 to 200 μm.

13.
The cellulose composition production method of any of 8 to 12 above, wherein the volume fraction in the cellulose composition of water-insoluble cellulose particles having an effective particle size as determined by wet laser diffraction of from 0.017 to 1 μm is at least 0.3%.

Advantageous Effects of Invention

The composition of the invention contains cellulose as the main ingredient and has an excellent shape retention. By forming this composition into a shape and drying it, a cellulose formed body composed of highly flexible cellulose can be provided. Materials obtained from the inventive cellulose composition which utilizes cellulose as the main ingredient and contains no resin ingredients are made of cellulose that, when burned, generates carbon dioxide but is carbon-neutral. Hence, they are biomass materials which have a low impact on the environment.

DESCRIPTION OF EMBODIMENTS

The cellulose composition, cellulose formed body and method for producing a cellulose composition according to the invention are described below.

[Cellulose Composition]

The cellulose composition of the invention is characterized by including:
 (A) a water-soluble cellulose ether,
 (B) water-insoluble cellulose particles, and
 (C) water.

The cellulose composition of the invention is preferably a kneaded material composed of:
 (A) a water-soluble cellulose ether,
 (B) water-insoluble cellulose particles,
 (C) water, and
 (D) a polyhydric alcohol and/or a derivative thereof.

[Component (A)]

The water-soluble cellulose ether is preferably nonionic, and is exemplified by alkylcellulose, hydroxyalkylcellulose and hydroxyalkylalkylcellulose.

An example of alkylcellulose is methylcellulose having a methoxy degree of substitution (DS) that is preferably from 1.3 to 2.9, and more preferably from 1.5 to 2.0. The alkoxy degree of substitution (DS) in alkylcellulose can be measured by converting the value obtained by measurement according to the method of analysis for methylcellulose in The Japanese Pharmacopoeia, 17$^{th}$ Edition.

An example of hydroxyalkylcellulose is hydroxyethylcellulose having a hydroxyethoxy molar substitution (MS) that is preferably from 1.1 to 2.7, and more preferably from 2.0 to 2.6. The hydroxyalkoxy molar substitution in hydroxyalkylcellulose can be measured by converting the value obtained by measurement according to the method of analysis for hydroxypropylcellulose in The Japanese Pharmacopoeia, 17$^{th}$ Edition.

Examples of hydroxyalkylalkylcellulose include hydroxyethylmethylcellulose having a methoxy degree of substitution (DS) that is preferably from 1.3 to 2.9, and more preferably from 1.3 to 2.0, and a hydroxyethoxy molar substitution (MS) that is preferably from 0.3 to 2.3, and more preferably from 0.3 to 1.0; and hydroxypropylmethylcellulose having a methoxy degree of substitution (DS) that is preferably from 1.3 to 2.9, and more preferably from 1.3 to 2.0, and a hydroxypropoxy molar substitution (MS) that is preferably from 0.1 to 0.6, and more preferably from 0.1 to 0.3. The alkoxy degree of substitution (DS) and hydroxyalkoxy molar substitution (MS) in the hydroxyalkylalkylcellulose can be measured by converting the values obtained by measurement according to the method of analysis for hypromellose (hydroxypropylmethylcellulose) in The Japanese Pharmacopoeia, 17$^{th}$ Edition.

DS, which stands for "degree of substitution," refers herein to the average number of alkoxy groups per anhydroglucose unit.

MS, which stands for "molar substitution," refers herein to the average number of moles of hydroxyalkoxy groups per anhydroglucose unit.

The water-soluble cellulose ether, as a 2 wt % aqueous solution, has a viscosity at 20° C. which, from the standpoint of shape retention during forming of the cellulose composition, is preferably from 3 to 300,000 mPa·s, more preferably from 15 to 35,000 mPa·s, and even more preferably from 50 to 10,000 mPa·s.

In cases where a 2 wt % aqueous solution of the water-soluble cellulose ether has a viscosity at 20° C. which is 600 mPa's or more, measurement can be carried out using, in accordance with "Viscosity measurement by rotational viscometer" under "Viscosity Determination" in the "General Tests, Processes and Apparatus" section of The Japanese Pharmacopoeia, 17$^{th}$ Edition, a single cylinder-type rotational viscometer (the same applies below). In cases where the viscosity is less than 600 mPa-s, measurement can be carried out using, in accordance with "Viscosity measurement by capillary tube viscometer" under "Viscosity Determination" in the "General Tests, Processes and Apparatus" section of The Japanese Pharmacopoeia, 17$^{th}$ Edition, an Ubbelohde viscometer (the same applies below).

From the standpoint of imparting the cellulose composition with plasticity and bindability, the content of the water-soluble cellulose ether in the cellulose composition is preferably from 5 to 20 wt %.

[Component (B)]

The water-insoluble cellulose particles are not particularly limited, so long as they are in the form of particles composed of water-insoluble celluloses that do not dissolve but are dispersible in water. Examples of water-insoluble celluloses include water-insoluble cellulose ethers, water-insoluble cellulose esters, and celluloses.

Examples of water-insoluble cellulose ethers include ethylcellulose, hydroxyethylcellulose, carboxymethylcellulose and low-substituted hydroxypropylcellulose. The ethoxy degree of substitution (DS) in ethylcellulose, from the standpoints of the grindability and water insolubility of the ethylcellulose, is preferably from 0.1 to 0.3, and more preferably from 0.2 to 0.3. The ethoxy degree of substitution (DS) in ethylcellulose can be measured by converting the value obtained by measurement according to the method of analysis for methylcellulose in The Japanese Pharmacopoeia, 17$^{th}$ Edition.

The hydroxyethoxy molar substitution (MS) in hydroxyethylcellulose, from the standpoints of the grindability and water insolubility of the hydroxyethylcellulose, is preferably from 0.1 to 0.3, and more preferably from 0.2 to 0.3. The hydroxyethoxy molar substitution (MS) in hydroxyethylcellulose can be measured by converting the value obtained by measurement according to the method of analysis for hydroxypropylcellulose in The Japanese Pharmacopoeia, 17$^{th}$ Edition.

The carboxymethyl degree of substitution (DS) in carboxymethylcellulose, from the standpoints of the grindability and water insolubility of the carboxymethylcellulose, is preferably from 0.1 to 0.3, and more preferably from 0.2 to 0.3. The carboxymethyl degree of substitution (DS) in carboxymethylcellulose can be measured by the method described on pages 183-184 of Chapter 4: "Analytic Methods for CMC" in Serogen monogatari [The story of Cellogen] published on Aug. 20, 1968 by Dai-Ichi Kogyo Seiyaku Co., Ltd., or by NMR analysis.

The hydroxypropoxy molar substitution (MS) in low-substituted hydroxypropylcellulose, from the standpoints of the grindability and water insolubility of the low-substituted hydroxypropylcellulose, is preferably from 0.1 to 0.4, and more preferably from 0.2 to 0.3. The hydroxypropoxy molar substitution (MS) in low-substituted hydroxypropylcellulose can be measured by converting the value obtained by measurement according to the method of analysis for low-substituted hydroxypropylcellulose in The Japanese Pharmacopoeia, 17$^{th}$ Edition.

Examples of water-insoluble cellulose esters include acetylated cellulose, cellulose nitrate, cellulose sulfate and cellulose phosphate.

The acetyl degree of substitution (DS) in acetylated cellulose, from the standpoints of the grindability and water insolubility of the acetylated cellulose, is preferably from 0.1 to 1.3, and more preferably from 0.2 to 1.0. The acetyl degree of substitution (DS) in acetylated cellulose can be measured by analysis with an NMR spectrometer.

The nitro group degree of substitution (DS) in cellulose nitrate, from the standpoints of the grindability and water insolubility of the cellulose nitrate, is preferably from 0.1 to 0.3, and more preferably from 0.2 to 0.3. The nitro group degree of substitution (DS) in cellulose nitrate can be measured by analysis with an NMR spectrometer or an infrared spectrometer.

The sulfonic acid group degree of substitution (DS) in cellulose sulfate, from the standpoints of the grindability and water insolubility of the cellulose sulfate, is preferably from 0.1 to 0.3, and more preferably from 0.2 to 0.3. The sulfonic acid group degree of substitution (DS) in cellulose sulfate can be measured by sulfonic acid group titration or by analysis with an NMR spectrometer or an infrared spectrometer.

The phosphoric acid group degree of substitution (DS) in cellulose phosphate, from the standpoints of the grindability and water insolubility of the cellulose phosphate, is preferably from 0.1 to 0.3, and more preferably from 0.2 to 0.3. The phosphoric acid group degree of substitution (DS) in cellulose phosphate can be measured by phosphoric acid group titration or by analysis with an NMR spectrometer or an infrared spectrometer.

Examples of celluloses include cellulose, microcrystalline cellulose, and cellulose oxidized using the TEMPO (2,2,6,6-tetramethylpiperidine-1-oxyl) catalyst (also referred to below as "TEMPO oxidized cellulose").

The carboxyl degree of substitution (DS) in TEMPO oxidized cellulose, from the standpoints of the grindability and water insolubility of the TEMPO oxidized cellulose, is preferably from 0.1 to 0.3, and more preferably from 0.2 to 0.3. The carboxyl degree of substitution (DS) in TEMPO oxidized cellulose can be measured by carboxylic acid titration. The TEMPO oxidized cellulose may be a sodium salt.

Two or more types of the above-described water-insoluble cellulose particles may be used together as the water-insoluble cellulose particles. Alternatively, the water-insoluble cellulose particles may be a mixture of particles composed of the above-described water-insoluble cellulose ether.

Of these water-insoluble cellulose particles, from the standpoint of imparting shape retention to the cellulose composition and imparting toughness to the cellulose formed body (dry formed body), particles made of low-substituted hydroxypropylcellulose are preferred.

The water-insoluble cellulose particles (B) have a volume-based mean particle size, as determined by wet laser diffraction, which is preferably from 0.017 to 200 µm, more preferably from 0.5 to 150 µm, and even more preferably from 5 to 100 µm. The shape of the water-insoluble cellulose particles may be fibrous.

Here, "volume-based mean particle size" refers to the volume-based arithmetic mean diameter and is determined by measurement of the wet particle size distribution using a laser diffraction/scattering method as the principle of measurement. Measurement can be carried out with, for example, a wet particle size analyzer that uses polarized light scattering intensity difference measurement (polarization intensity differential scattering, or "PIDS"), Mie scattering and Fraunhofer diffraction. An example of a wet particle size analyzer that uses polarization intensity differential scattering (PIDS), Mie scattering and Fraunhofer diffraction is the LS 13-320 particle size analyzer from Beckman Coulter. The Beckman Coulter LS 13-320 particle size analyzer is an instrument equipped with multiple optical systems that utilize the Fraunhofer diffraction and Mie scattering theories and the polarization intensity differential scattering (PIDS) theory. This instrument, by using laser light of different wavelengths and the combined analysis of the light scattering patterns of horizontal polarization and vertical polarization and of laser diffraction patterns, is able to determine the effective particle sizes (µm) corresponding to these light scattering patterns and the volume fractions (%) of each effective particle size.

The amount of water-insoluble cellulose particles added in the cellulose composition, from the standpoint of the shape retention of the cellulose composition, is preferably from 30 to 150 parts by weight, and more preferably from 50 to 150 parts by weight, per 100 parts by weight of the water-soluble cellulose ether.

[Component (C)]

The water is not particularly limited, so long as it does not hinder the performance of the cellulose composition or the performance of the cellulose formed body after moisture has been removed by drying. Examples include tap water, deionized water and distilled water.

The amount of water added in the cellulose composition, from the standpoint of making it possible to easily carry out forming of the cellulose composition and also ensuring shape retention, is preferably from 300 to 1,000 parts by weight, and more preferably from 500 to 800 parts by weight, per 100 parts by weight of the water-soluble cellulose ether.

[Component (D)]

Polyhydric alcohols and/or derivatives thereof may be optionally included as additives in the cellulose composition of the invention to increase the shape retention of the cellulose composition and the toughness of the cellulose formed body.

Examples of the polyhydric alcohols and/or derivatives thereof include glycerol, propylene glycol, lauryl esters of glycerol, the monomethyl ether of propylene glycol and the dimethyl ether of propylene glycol. Commercially available products may be used for this purpose.

From the standpoint of imparting shape retention to the cellulose composition and imparting plasticity to the cellulose formed body, the amount of additive included in the cellulose composition is preferably not more than 100 parts by weight, more preferably from 5 to 100 parts by weight, and even more preferably from 10 to 50 parts by weight, per 100 parts by weight of the water-soluble cellulose ether.

The cellulose composition of the invention is able to ensure a shape retention after forming that has been unachievable in compositions made up only of a water-soluble cellulose ether and water.

The inventors have discovered that, by setting the volume fraction in the water-insoluble cellulose particles (B) of water-insoluble cellulose particles having an effective particle size as determined by wet laser diffraction of from 0.017 to 1 µm to 0.3% or more, even a cellulose composition composed only of water-insoluble cellulose particles, a water-soluble cellulose ether and water can impart sufficient toughness to a dry formed body (cellulose formed body) without the addition of other polymers.

That is, in the cellulose composition of the invention, the volume fraction in component (B) (water-insoluble cellulose particles) of water-insoluble cellulose particles having an effective particle size as determined by wet laser diffraction of from 0.017 to 1 µm is preferably at least 0.3%, more preferably from 0.3 to 50%, even more preferably from 0.3 to 40%, and still more preferably from 0.3 to 10%. By setting the volume fraction of water-insoluble cellulose particles having an effective particle size of from 0.017 to 1 µm in the above range, the toughness of a cellulose formed body obtained by forming and drying the cellulose composition of the invention can be improved.

The volume fraction in the water-insoluble cellulose particles of water-insoluble cellulose particles having an effective particle size as determined by wet laser diffraction of from 0.017 to 1 µm can be measured using a wet particle size analyzer that utilizes polarization intensity differential scattering (PIDS), Mie scattering and Fraunhofer diffraction. An example of a wet particle size analyzer that utilizes polarization intensity differential scattering (PIDS) is the Beckman Coulter LS 13-320 particle size analyzer. The Beckman Coulter LS 13-320 is an instrument equipped with multiple optical systems that utilize the Fraunhofer diffraction and Mie scattering theories and the polarization intensity differential scattering (PIDS) theory. This instrument, by using laser light of different wavelengths and the combined analysis of information on the light scattering patterns of horizontal polarization and vertical polarization and of laser diffraction patterns, is able to determine the effective particle sizes (µm) corresponding to these light scattering patterns and the volume fractions (%) of each effective particle size.

The volume fraction in the water-insoluble cellulose particles of water-insoluble cellulose particles having an effective particle size as determined by wet laser diffraction of from 0.017 to 1 µm is defined with respect to particles of from 0.017 to 2,000 µm.

[Cellulose Formed Body]

A cellulose formed body can be obtained by forming and then drying the cellulose composition of the invention.

(Cellulose Composition Forming Step)

Because the cellulose composition of the invention is in the form of a clay having viscosity and plasticity, and the tackiness of the composition has been minimized, processing can be easily carried out with various types of processing equipment such as extruders and pressing machines. Manual shaping is also possible by working and spreading the cellulose composition by hand.

The cellulose composition of the invention has an excellent shape retention, and so can be formed into any shape according to the intended use, including rectangular bodies, spheres, ring shapes or U-shaped stand shapes. An object obtained by thus forming the cellulose composition is referred to as a "cellulose composition formed body."

(Cellulose Composition Drying Step)

Next, the cellulose composition formed body that has been thus formed is dried, removing moisture within the cellulose composition and giving a cellulose formed body.

From the standpoint of having the cellulose composition formed body dry rapidly without burning, the drying temperature is preferably between 60° C. and 120° C. From the standpoint of preventing the water-insoluble cellulose particles and the water-soluble cellulose ether from overheating and deteriorating, the drying time is preferably from 0.5 to 24 hours.

From the standpoint of preventing the growth of putrefactive bacteria in the cellulose formed body, the moisture content of the cellulose formed body for which such drying has been completed is preferably not more than 10 wt %, and more preferably from 0.1 to 5 wt %.

The moisture content of the cellulose formed body can be computed from the formula below by measuring the weight of the dried cellulose formed body after drying, further drying (additional drying) the cellulose formed body at 105° C. to a constant weight, and determining the weight of the cellulose formed body after additional drying.

Moisture content (%)=
{(weight of cellulose formed body before additional drying)−(weight of cellulose formed body after additional drying)}÷(weight of cellulose formed body before additional drying)×100

[Method for Producing Cellulose Composition]

The inventive method for producing a cellulose composition is characterized by including the step of mixing together (a) a water-soluble cellulose ether starting powder, (b) a water-insoluble cellulose particle starting powder and (c) water so as to obtain a cellulose composition.

It is preferable for the cellulose composition at this time to be one which includes water-insoluble cellulose particles having a volume-based mean particle size, as measured by wet laser diffraction, of from 0.017 to 200 µm.

Here, the water-soluble cellulose ether starting powder (a) is a powder that serves as the starting material for a component that satisfies the requirements for above-described component (A).

From the standpoint of the solubility in water, the water-soluble cellulose ether starting powder (a) has a volume-based mean particle size, as determined by dry laser diffraction, that is preferably from 20 to 300 µm, more preferably from 25 to 250 µm, and even more preferably from 40 to 100 µm.

The volume-based mean particle size refers herein to the diameter corresponding to the 50% cumulative value on the volume-based cumulative particle size distribution curve and can be measured using the Mastersizer 3000 (Malvern Instruments) laser diffraction-type particle size analyzer and based on the Fraunhofer diffraction theory, by the dry method and at a dispersion pressure of 2 bar and a scattering intensity of 2 to 10% (the same applies below).

The water-soluble cellulose ether starting powder that is used may be one produced by a known method or may be a commercially available product.

The water-insoluble cellulose particle starting powder (b) is a powder that serves as the starting material for a component that satisfies the requirements for above-described component (B).

The water-insoluble cellulose particle starting powder (b) is included in an amount, per 100 parts by weight of (a) the water-soluble cellulose ether starting powder, which is preferably from 30 to 150 parts by weight, and more preferably from 50 to 150 parts by weight.

The water-insoluble cellulose particles that make up the water-insoluble cellulose particle starting powder (b) have a volume-based mean particle size as determined by wet laser diffraction which, in order to set component (B) in the cellulose composition within the desired mean particle size range, is preferably from 0.017 to 200 µm, more preferably from 0.5 to 150 µm, and even more preferably from 5 to 100 µm. The water-insoluble cellulose particle starting powder may have a particle shape that is fibrous. The water-insoluble cellulose particle starting powder (b) used in this case may be one produced by a known method or may be a commercially available product.

In cases where the subsequently described kneading/extrusion treatment and grinding treatment are carried out in the inventive method for producing a cellulose composition, from the standpoint of dispersibility during production of the cellulose composition, the volume-based mean particle size, as determined by wet laser diffraction, of the water-insoluble cellulose particles that make up the water-insoluble cellulose particle starting powder (b) is preferably from 3 to 200 µm, more preferably from 30 to 100 µm, and even more preferably from 40 to 60 µm. The water-insoluble cellulose particle starting powder has a particle shape that may be fibrous.

The water-insoluble cellulose particle starting powder (b) that is used in this case may be one produced by a known method or may be a commercially available product. When such a water-insoluble cellulose particle starting powder is dispersed in water, the volume fraction in the water-insoluble cellulose particles of water-insoluble cellulose particles having an effective particle size of from 0.017 to 1 µm, as determined by wet laser diffraction, is generally 0%.

The water (c) is one that satisfies the requirements for above-described component (C) above.

The amount of water (c) included per 100 parts by weight of (a) the water-soluble cellulose ether starting powder is preferably from 300 to 1,000 parts by weight, and more preferably from 500 to 800 parts by weight.

From the standpoint of the solubility of the water-soluble cellulose ether starting powder, the temperature of the water at the time of addition is preferably between 5° C. and 40° C.

To increase the shape retention of the cellulose composition and the toughness of the cellulose formed body, polyhydric alcohols and/or derivatives thereof which satisfy the requirements for above-described component (D) may be optionally added when producing the cellulose composition of the invention.

In the cellulose composition production method of the invention, such mixing may involve first mixing together (a) the water-soluble cellulose ether starting powder and (b) the water-insoluble cellulose particle starting powder, and then adding and mixing in (c) water or may involve first mixing together (b) the water-insoluble cellulose particle starting powder and (c) water, and then adding and mixing in (a) the water-soluble cellulose ether starting powder.

In the cellulose composition production method of the invention, it is preferable for such mixing to be kneading/extrusion treatment that continuously carries out kneading treatment and extrusion treatment.

An example of kneading/extrusion equipment that carries out such kneading/extrusion treatment is a screw-type kneader/extruder (model FM-P20E, from Miyazaki Iron Works Co., Ltd.) which continuously carries out kneading, vacuum deaeration and extrusion.

The discharge temperature in the kneader/extruder, from the standpoint of preventing a change in viscosity due to heating of the water-soluble cellulose ether, is not more than 40° C., and preferably between 15° C. and 40° C.

The discharge speed in the kneader/extruder, from the standpoint of preventing a change in shape due to a difference in discharge speeds at the periphery and the interior of the cellulose composition during extrusion, is preferably from 2 to 50 cm/min. The screw speed in the kneader/extruder, from the standpoint of maintaining the above discharge speed, is preferably from 10 to 30 rpm.

There is no particular limitation on the number of kneading/extrusion treatments.

Of the above-described cellulose compositions of the invention, a cellulose composition with a volume fraction in component (B) (the water-insoluble cellulose particles) of water-insoluble cellulose particles having an effective particle size, as determined by wet laser diffraction, of from 0.017 to 1 µm that is at least 0.3% can be produced by the following methods (Production Methods 1, 2, 3, 4, and 5).

(Production Method 1)

In the above-described cellulose composition production method of the invention, to achieve in advance the desired particle size distribution at the raw material preparation stage for the water-insoluble cellulose particle starting powder (b), it is preferable to carry out such mixture after first mixing together two or more types of water-insoluble cellulose particle powders and thereby adjusting the particle size distribution such that the volume fraction within the water-insoluble cellulose particles of water-insoluble cellulose particles having an effective particle size as determined by wet laser diffraction of from 0.017 to 1 µm is at least 0.3%. In this case, of the two or more types of water-insoluble cellulose particle powders, it is preferable to have one be a cellulose nanofiber (CNF) powder and to have the others be water-insoluble cellulose particle powders with a volume-based mean particle size, as determined by wet laser diffraction, of from 30 to 100 µm.

(Production Method 2)

In the above-described cellulose composition production method of the invention, it is preferable to dry-grind the water-insoluble cellulose particle starting powder in advance at the ingredient preparation stage for the water-insoluble cellulose particle starting powder (b) and thereby adjust the particle size distribution such that the volume fraction within the water-insoluble cellulose particles of water-insoluble cellulose particles having an effective particle size as determined by wet laser diffraction of from 0.017 to 1 µm is at least 0.3%.

In this case, because the energy required for dry grinding is sometimes excessive, wet grinding at the composition preparation stage may be preferred. When the water-insoluble cellulose particle starting powder is ground in a wet state, it absorbs water and swells, therefore pulverizing more easily, which is preferable because this can be achieved by the kneading step and grinding treatment described below.

(Production Method 3)

The volume fraction, within the water-insoluble cellulose particles in the cellulose composition, of water-insoluble cellulose particles having an effective particle size as determined by wet laser diffraction of from 0.017 to 1 µm can be adjusted by way of the number of the above kneading/extrusion treatments. That is, in the above-described cellulose composition production method of the invention, it is preferable to carry out the kneading/extrusion treatment either one time or two or more times so as to obtain a cellulose composition containing a water-insoluble cellulose particle component wherein the volume fraction of water-insoluble cellulose particles having an effective particle size as determined by wet laser diffraction of from 0.017 to 1 µm is at least 0.3%.

(Production Method 4)

In the above-described cellulose composition production method of the invention, it is preferable to carry out the step of subjecting a cellulose mixture of (a) a water-soluble cellulose ether starting powder, (b) a water-insoluble cellulose particle starting powder and (c) water to grinding treatment that pulverizes the water-insoluble cellulose particles, and the step of kneading the cellulose mixture following grinding treatment to obtain a cellulose composition. In this way, there can be obtained a cellulose composition that includes a water-insoluble cellulose particle component wherein the volume fraction of water-insoluble cellulose particles having an effective particle size as determined by wet laser diffraction of from 0.017 to 1 µm is at least 0.3%.

The grinding treatment method (grinding method) is exemplified by methods that grind by feeding the cellulose mixture between two rotating disk-shaped grinders and causing shear forces to act on the cellulose mixture, methods that grind with a screw-type kneader by causing the compressive and shearing forces of a rotating screw to act on the cellulose mixture, and methods that grind by using a vibratory ball mill, colloid mill, homogenizing mixer, homogenizer or the like to apply a high pressure to the cellulose mixture. Apparatuses that use disk-like grinders are exemplified by a stone mill-type grinding mill (the Masscolloider MICK6-3, from Masuko Sangyo Co., Ltd.). In this case, grinding can be carried out by setting two grinders one above the other with the flat surfaces of the grinders in mutual contact and passing through the cellulose mixture from 10 to 200 times while the grinders rotate at a speed of from 500 to 3,000 rpm.

The kneading step in this case is preferably carried out by kneading/extrusion treatment that continuously carries out the above-described kneading treatment and extrusion treatment. In this case as well, kneading/extrusion treatment may be carried out either once or two or more times.

(Production Method 5)

In the above-described cellulose composition production method of the invention, it is preferable for the mixing step to be carried out after carrying out the step of preparing a water-insoluble cellulose particle dispersion by mixing together (b) the water-insoluble cellulose starting powder and (c) water, the step of subjecting the water-insoluble cellulose particle dispersion to grinding treatment that pulverizes the water-insoluble cellulose particles, and the step of adding (a) the water-soluble cellulose ether starting powder to the water-insoluble cellulose particle dispersion following grinding treatment. In this way, there can be obtained a cellulose composition that includes a water-insoluble cellulose particle component wherein the volume fraction of water-insoluble cellulose particles having an effective particle size as determined by wet laser diffraction of from 0.017 to 1 µm is at least 0.3%.

Grinding treatment on the water-insoluble cellulose particle dispersion may be carried out by the above-described methods.

The kneading step in this case is preferably carried out by kneading/extrusion treatment that continuously carries out kneading treatment and extrusion treatment. In this case as well, kneading/extrusion treatment may be carried out either once or two or more times.

Because the cellulose serving as the raw material in the water-insoluble cellulose particles is a natural product, the properties of the starting powder sometimes differ to a small degree. Therefore, in above Production Methods 3, 4 and 5, even when production is carried out with exactly the same formulation and under the same production conditions, the volume fraction in the water-insoluble cellulose particles within the cellulose composition of water-insoluble cellulose particles having an effective particle size as determined by wet laser diffraction of from 0.017 to 1 µm sometimes varies. As a result, there are sometimes cases in which a cellulose formed body having the desired toughness cannot be obtained.

Hence, in above Production Methods 3, 4 and 5, it is preferable to measure for the resulting cellulose composition, with a wet particle size analyzer that uses polarization intensity differential scattering (PIDS), the volume fraction in the water-insoluble cellulose particles of water-insoluble cellulose particles having an effective particle size as determined by wet laser diffraction of from 0.017 to 1 µm, and confirm that the volume fraction is the desired value of preferably 0.3% or more.

In this way, following production of the cellulose composition, it is possible to avoid having to fabricate a cellulose formed body and check its toughness, enabling a cellulose composition having a stable performance to be produced.

In cases where the particle size distribution (volume fraction basis) of the water-insoluble cellulose particles does not satisfy the prescribed conditions, it is possible to adjust the particle size distribution (volume fraction basis) of the water-insoluble cellulose particles by further repeating the above grinding treatment and kneading/extrusion treatment. For example, in a case where the volume fraction of water-insoluble cellulose particles having an effective particle size as determined by wet laser diffraction of from 0.017 to 1 µm has fallen below the desired value, it is preferable to further carry out the kneading/extrusion treatment until the desired value is achieved.

EXAMPLES

Examples and Comparative Examples are given below to more fully illustrate the invention, although the invention is not limited by these Examples.

Example 1

<Details on Materials Used>
(1) Water-soluble cellulose ether starting powders: shown in Table 1
(2) Water-insoluble cellulose particle starting powders: shown in Table 2
(3) Water: tap water

TABLE 1

Water-soluble cellulose ether starting powders

| Grade | Viscosity (mPa · s) | DS (—) | MS (—) | Mean particle size (µm) |
|---|---|---|---|---|
| HPMC-1 | 4,000 | 1.45 | 0.18 | 79 |
| HPMC-2 | 50 | 1.88 | 0.24 | 59 |
| HEMC | 30,000 | 1.47 | 0.31 | 71 |
| MC | 4,000 | 1.83 | — | 44 |
| HEC | 4,000 | — | 2.48 | 240 |

In Table 1, HPMC is an abbreviation for hydroxypropylmethylcellulose, HEMC stands for hydroxyethylmethylcellulose, MC for methylcellulose and HEC for hydroxyethylcellulose.

Also, in Table 1, the degree of substitution (DS) represents the alkoxy degree of substitution, and the molar substitution (MS) represents the number of moles of hydroxyalkoxy group substitution.

The mean particle sizes in Table 1 are the volume-based mean particle sizes of the starting powders, as determined by wet laser diffraction.

TABLE 2

Water-insoluble cellulose particle starting powders

| Grade | DS (—) | MS (—) | Mean particle size (µm) | Volume fraction* (%) |
|---|---|---|---|---|
| L-HPC-1 | — | 0.34 | 55 | 0 |
| L-HPC-2 | — | 0.26 | 51 | 0 |
| L-HPC-3 | — | 0.18 | 50 | 0 |
| Cellulose | — | — | 90 | 0 |
| Microcrystalline cellulose | — | — | 45 | 0 |

*Volume fraction in water-insoluble cellulose particle starting powder of water-insoluble cellulose particles having an effective particle size, as determined by wet laser diffraction, of from 0.017 to 1 µm.

In Table 2, L-HPC is an abbreviation for low-substituted hydroxypropylcellulose. The cellulose is powder cellulose from Nippon Paper Industries Co., Ltd. (trade name: KC Flock®), and the microcrystalline cellulose is crystalline cellulose from Asahi Kasei Corporation (trade name: Ceolus® PH-101).

The degree of substitution (DS) in Table 2 represents the alkoxy degree of substitution, and the molar substitution (MS) represents the number of moles of hydroxyalkoxy group substitution.

The mean particle sizes in Table 2 are the volume-based mean particle sizes of the starting powders, as determined by wet laser diffraction.

(Methods of Measuring Volume-Based Mean Particle Size of Water-Insoluble Cellulose Particle Starting Powder by Wet Laser Diffraction, and Volume Fraction in Water-Insoluble Cellulose Particle Starting Powder of Water-Insoluble Cellulose Particles Having Effective Particle Size as Determined by Wet Laser Diffraction of 0.017 to 1.00 µm)

A sample dispersion was prepared by dispersing 0.01 g of water-insoluble cellulose particle starting powder in 100 mL of 20° C. water.

The prepared sample dispersion was introduced into a wet particle analyzer (Beckman Coulter model LS 13-320) until an indication that the measurement concentration is optimal. Measurement was then carried out under the following settings.

(Equipment Settings)
Pump speed: 39
Measurement time: 90 seconds
Optical model (particle refractive index):
 Refractive index of dispersion medium (water): real part, 1.333
 Refractive index of sample: real part, 1.40; imaginary part, 0.00

<Production of Cellulose Composition>

Using the ingredients in the proportions shown in Table 3, first the water-soluble cellulose ether starting powder and the water-insoluble cellulose particle starting powder were mixed together, then the 20° C. water was added and mixed in, thereby giving a cellulose mixture. The volume fraction in the water-insoluble cellulose particles of water-insoluble cellulose particles having an effective particle size as determined by wet laser diffraction of from 0.017 to 1.00 µm was measured for this cellulose mixture by the measurement method shown below, and was found in each case to be 0%.

(Method of Measuring Volume Fraction of Water-Insoluble Cellulose Particles Having Effective Particle Size as Determined by Wet Laser Diffraction of 0.017 to 1.00 µm in Cellulose Composition)

A sample solution was prepared by dissolving 1.5 g of the cellulose mixture in 100 mL of 20° C. water.

The prepared sample dispersion was introduced into a wet particle analyzer (Beckman Coulter model LS 13-320) until an indication that the measurement concentration was optimal. Measurement was then carried out under the following settings.

(Equipment Settings)
Pump speed: 39
Measurement time: 90 seconds
Optical model (particle refractive index):
 Refractive index of dispersion medium (water): real part, 1.333
 Refractive index of sample: real part, 1.40; imaginary part, 0.00

Next, using a screw-type kneader/extruder (model FM-P20E, from Miyazaki Iron Works Co., Ltd.), kneading/extrusion treatment was carried out the number of times shown in Table 3 on the resulting cellulose mixture at a discharge temperature of 20° C., a discharge speed of 10 cm/min and a screw speed of 20 rpm, thereby producing a cellulose composition in the form of a 4 mm diameter rope. A sample solution for particle size analysis of the water-insoluble cellulose particles by wet laser diffraction was prepared from the resulting cellulose composition in the same way as for the cellulose mixture above, and the mean particle size was measured using a wet particle size analyzer (Beckman Coulter model LS 13-320). The volume fraction in the water-insoluble cellulose particles of water-insoluble cellulose particles having an effective particle size, as determined by wet laser diffraction, of from 0.017 to 1.00 μm was measured in the same way as for the cellulose mixture above.

<Evaluation of Cellulose Composition and Cellulose Formed Body>

The following evaluations were carried out using the cellulose composition obtained as described above.

(Shape Retention of Cellulose Composition)

Twenty grams of the above cellulose composition in the form of a 4 mm diameter rope was balled up and formed into a 4 cm diameter sphere. This spherical cellulose composition was sandwiched between two iron plates (each 10 cm long×10 cm wide×0.3 cm thick) and placed on a desk, and a 20 kg weight was set on the top plate where the plate diagonals intersect and left at rest for 2 minutes. The weight and the iron plates were then removed, the outer diameter to which the formed cellulose composition had spread was measured with a vernier caliper, and the percent change in the outer diameter was determined from the following formula.

Change in diameter (%)=[measured diameter (cm)÷4]×100

In this case, a smaller percent change in diameter means that the formed article deforms less readily, indicating good shape retention.

(Cellulose Formed Body Toughness Test 1)

The above cellulose composition in the form of a 4 mm diameter rope was formed into a ring and dried for 2 hours at 80° C., thereby producing a 24 cm diameter ring-shaped cellulose formed body having a moisture content of 5%.

The ring-shaped cellulose formed body thus produced was checked for the presence or absence of breaks after being twisted into a figure eight.

(Cellulose Formed Body Toughness Test 2)

The above cellulose composition was formed into a U-shaped stand (C-shaped channel shape) having a crown width of 12 mm, a leg length (staple leg length) of 5 mm and a thickness of 0.5 mm, following which it was cut into the shape of 0.5 mm diameter staples and dried 14 hours at 80° C., thereby producing cellulose formed bodies in the shape of staples for a stapler and having a moisture content of 5%.

The legs in the staple-shaped cellulose formed bodies at this time were in a 90-degree bent state with respect to the crown portion.

The leg portions of these cellulose bodies were bent so as to push them toward the crown portion side (i.e., as when joining together sheets of paper with a staple), and the angle to which bending is possible from the initial angle position (bending angle) was measured. The bending angle when the staple leg portions could not be bent at all was 0 degrees, and the bending angle when the staple legs could be bent until they come into contact with the crown portion was 90 degrees.

The above results are shown in Table 3.

All of the cellulose compositions in Example 1 had better shape retentions than the cellulose composition in Comparative Example 1-1. Upon comparing Examples 1-15 and 1-16 with Comparative Example 1-1, it was apparent that merely including water-insoluble cellulose particles of a given mean particle size as determined by wet laser scattering improves the shape retention over that of a composition consisting solely of water-soluble cellulose ether and water (Comparative Example 1-1).

In the cellulose compositions of Examples 1-1 to 1-8, 1-12, 1-13 and 1-15, when low-substituted hydroxypropylcellulose (L-HPC) was used as the water-insoluble cellulose particles, methylcellulose (MC) or hydroxypropylmethylcellulose (HPMC) was used as the water-soluble cellulose ether and kneading/extrusion treatment was carried out, the percent change in diameter of the cellulose composition was in each case 138% or less, indicating better shape retention.

In the cellulose compositions of Examples 1-1 to 1-14, by setting the volume fraction in the water-insoluble cellulose particles of water-insoluble cellulose particles having an effective particle size as determined by wet laser diffraction of from 0.017 to 1.00 μm to at least 0.3%, the cellulose molded body was found to have an improved toughness and to be capable of withstanding twisting and folding.

Also, as in Examples 1-1 and 1-15 and Examples 1-9 to 1-11, there were cases in which, although the number of kneading/extrusion treatments was the same, the volume fraction in the water-insoluble cellulose particles of water-insoluble cellulose particles having an effective particle size as determined by wet laser diffraction of from 0.017 to 1.00 μm differed and was variable. In such cases, the volume fraction for the cellulose composition can be checked by using a wet particle size analyzer that utilizes polarization intensity differential scattering (PIDS), Mie scattering and Fraunhofer diffraction, enabling the cellulose composition of the invention to be efficiently produced.

TABLE 3

| | | | Example 1-1 | Example 1-2 | Example 1-3 | Example 1-4 | Example 1-5 | Example 1-6 | Example 1-7 | Example 1-8 | Example 1-9 |
|---|---|---|---|---|---|---|---|---|---|---|---|
| Ingredients | Water-soluble cellulose ether starting powder | Grade | HPMC-1 | HPMC-1 | HPMC-1 | HPMC-1 | HPMC-1 | HPMC-1 | HPMC-1 | HPMC-1 | HPMC-1 |
| | | Content (pbw) | 100 | 100 | 100 | 100 | 100 | 100 | 100 | 100 | 100 |
| | Water-insoluble cellulose particle starting powder | Grade | L-HPC-1 | L-HPC-2 | L-HPC-2 | L-HPC-2 | L-HPC-2 | L-HPC-2 | L-HPC-2 | L-HPC-3 | cellulose |
| | | Content (pbw) | 120 | 120 | 120 | 120 | 120 | 120 | 120 | 150 | 120 |
| | Water | Content (pbw) | 560 | 560 | 560 | 560 | 560 | 560 | 560 | 560 | 560 |

TABLE 3-continued

| | | | | | | | | | | | |
|---|---|---|---|---|---|---|---|---|---|---|---|
| Cellulose mixture | Water-insoluble cellulose particles | Volume fraction* (%) | 0 | 0 | 0 | 0 | 0 | 0 | 0 | 0 | 0 |
| | Kneading/ extrusion treatment | Number of treatments | — | 10 | 20 | 30 | 40 | 50 | 55 | 45 | 2 |
| Cellulose composition | Water-insoluble cellulose particles | Mean particle size (μm) | 40 | 28 | 25 | 20 | 15 | 10 | 8 | 17 | 38 |
| | | Volume fraction* (%) | 0.3 | 5.0 | 15 | 25 | 35 | 45 | 50 | 40 | 0.4 |
| Evaluation results | Shape retention | Change in diameter (%) | 130 | 133 | 130 | 135 | 128 | 135 | 133 | 125 | 150 |
| | Toughness Test 1 | Breakage on twisting | no | no | no | no | no | no | no | no | no |
| | Toughness Test 2 | Bending angle (°) | +30 | +40 | +50 | +60 | +70 | +80 | +90 | +90 | +20 |

| | | | Example 1-10 | Example 1-11 | Example 1-12 | Example 1-13 | Example 1-14 | Example 1-15 | Example 1-16 | Comparative Example 1-1 |
|---|---|---|---|---|---|---|---|---|---|---|
| Ingredients | Water-soluble cellulose ether starting powder | Grade | HPMC-2 | HPMC-2 | MC | HEMC | HEC | HPMC-1 | HPMC-1 | HPMC-1 |
| | | Content (pbw) | 100 | 100 | 100 | 100 | 100 | 100 | 100 | 100 |
| | Water-insoluble cellulose particle starting powder | Grade | micro-crystalline cellulose | cellulose | L-HPC-1 | L-HPC-3 | L-HPC-2 | L-HPC-1 | L-HPC-1 | — |
| | | Content (pbw) | 120 | 120 | 120 | 120 | 120 | 120 | 120 | — |
| | Water | Content (pbw) | 560 | 560 | 560 | 560 | 560 | 560 | 560 | 560 |
| Cellulose mixture | Water-insoluble cellulose particles | Volume fraction* (%) | 0 | 0 | 0 | 0 | 0 | 0 | 0 | — |
| | Kneading/ extrusion treatment | Number of treatments | 2 | 2 | 39 | 29 | 51 | 1 | 0 | 0 |
| Cellulose composition | Water-insoluble cellulose particles | Mean particle size (μm) | 36 | 33 | 18 | 24 | 18 | 44 | 55 | — |
| | | Volume fraction* (%) | 0.7 | 0.5 | 30 | 20 | 40 | 0 | 0 | — |
| Evaluation results | Shape retention | Change in diameter (%) | 158 | 158 | 123 | 125 | 150 | 138 | 155 | 175 |
| | Toughness Test 1 | Breakage on twisting | no | no | no | no | no | yes | yes | yes |
| | Toughness Test 2 | Bending angle (°) | +20 | +20 | +70 | +50 | +90 | +5 | +2 | +1 |

*Volume fraction in water-insoluble cellulose particles of water-insoluble cellulose particles having effective particle size, as determined by wet laser diffraction, of 0.017 to 1 μm.

Example 2

Cellulose compositions were produced in the following way.

First, of the ingredients shown in Table 4, the water-insoluble cellulose particle starting powder and water (20° C.) were mixed together to prepare a water-insoluble cellulose particle dispersion.

Next, grinding treatment was carried out on this water-insoluble cellulose particle dispersion. Grinding treatment was carried out using a stone mill-type grinding mill (the Masscolloider MICK6-3, from Masuko Sangyo Co., Ltd.) in which two grinders (MKG-C6-80) are arranged one above the other with the flat surfaces of the grinders in contact, at a grinding speed of 1,800 rpm and by passing the water-insoluble cellulose particle dispersion through the mill 20 times (number of grinding treatments, 20).

Next, the water-soluble cellulose ether starting powder was added to and mixed with the treated water-insoluble cellulose particle dispersion, giving a cellulose mixture. This cellulose mixture was then subjected to 10 kneading/extrusion treatments using a screw-type kneader/extruder (model FM-P20, from Miyazaki Iron Works Co., Ltd.) at a discharge temperature of 20° C., a discharge speed of 10 cm/min and a screw speed of 20 rpm, thereby producing a cellulose composition in the form of a 4 mm diameter rope. A sample solution for measuring the particle size analysis of the water-insoluble cellulose particles by wet laser diffraction was prepared for the resulting cellulose composition in the same way as in Example 1, and the mean particle size was measured using a wet particle size analyzer (Beckman Coulter model LS 13-320). The volume fraction in the water-insoluble cellulose particles of water-insoluble cellulose particles having an effective particle size, as determined by wet laser diffraction, of from 0.017 to 1.00 µm was measured in the same way as for the above cellulose mixture.

The resulting cellulose compositions were used to carry out evaluations in the same way as in Example 1.

The results are shown in Table 4.

In this Example as well, the shape retention of the cellulose compositions and the toughness of the cellulose formed bodies were confirmed to be excellent.

TABLE 4

| | | | Example 2-1 | Example 2-2 |
|---|---|---|---|---|
| Ingredients | Water-soluble cellulose ether starting powder | Grade | HPMC-1 | HPMC-1 |
| | | Content (pbw) | 100 | 100 |
| | Water-insoluble cellulose particle starting powder | Grade | L-HPC-3 | Cellulose |
| | | Content (pbw) | 120 | 120 |
| | Water | Content (pbw) | 560 | 560 |
| Water-insoluble cellulose particle dispersion | Grinding treatment | Number of treatments | 20 | 20 |
| Cellulose mixture | Kneading/extrusion treatment | Number of treatments | 10 | 10 |
| Cellulose composition | Water-insoluble cellulose particles | Mean particle size (µm) | 19 | 18 |
| | | Volume fraction* (%) | 40 | 40 |
| Evaluation results | Shape retention | Change in diameter (%) | 128 | 150 |
| | Toughness Test 1 | Breakage on twisting | no | no |
| | Toughness Test 2 | Bending angle (°) | +70 | +80 |

*Volume fraction in water-insoluble cellulose particles of water-insoluble cellulose particles having effective particle size, as determined by wet laser diffraction, of 0.017 to 1 µm.

Although some preferred embodiments of the invention have been described above, the invention is not limited thereby, various modifications such as other embodiments, additions, variations and deletions being possible within a range conceivable by those skilled in the art, insofar as all such variations exhibit the working effects of the invention and are encompassed within the scope of the invention.

The invention claimed is:

1. A cellulose composition comprising:
   (A) 100 parts by weight of a water-soluble cellulose ether,
   (B) 30 to 150 parts by weight of water-insoluble cellulose particles, and
   (C) 300 to 1,000 parts by weight of water,
   wherein the cellulose composition is in the form of a clay having viscosity and plasticity.

2. The cellulose composition of claim 1, wherein the water-insoluble cellulose particles serving as component (B) have a volume-based mean particle size as determined by wet laser diffraction of from 0.017 to 200 µm.

3. The cellulose composition of claim 1, wherein the volume fraction in component (B) of water-insoluble cellulose particles having an effective particle size as determined by wet laser diffraction of from 0.017 to 1 µm is at least 0.3%.

4. The cellulose composition of claim 1, wherein component (B) is a low-substituted hydroxypropylcellulose having a hydroxypropoxy molar substitution (MS) of from 0.1 to 0.4.

5. The cellulose composition of claim 1, wherein component (A) is at least one selected from the group consisting of hydroxypropylmethylcellulose, hydroxyethylmethylcellulose and methylcellulose.

6. The cellulose composition of claim 1, wherein a content of the water-soluble cellulose ether in the cellulose composition is from 5 to 20 wt %.

7. The cellulose composition of claim 1, which consists of components (A), (B) and (C).

8. The cellulose composition of claim 1, which is a kneaded material comprising components (A), (B) and (C).

9. A method for producing the cellulose composition according to claim 1, which method comprises the step of mixing together (a) a water-soluble cellulose ether starting powder, (b) a water-insoluble cellulose particle starting powder and (c) water to obtain the cellulose composition.

10. The cellulose composition production method of claim 9, wherein the mixing step is kneading/extrusion treatment that continuously carries out kneading treatment and extrusion treatment.

11. The cellulose composition production method of claim 9, wherein the mixing step is carried out after carrying out the step of preparing a water-insoluble cellulose particle dispersion by mixing together (b) the water-insoluble cellulose particle starting powder and (c) water, the step of subjecting the water-insoluble cellulose particle dispersion to grinding treatment that pulverizes the water-insoluble cellulose particles and the step of adding (a) the water-soluble cellulose ether starting powder to the water-insoluble cellulose particle dispersion following grinding treatment.

12. The cellulose composition production method of claim 9, wherein the ingredients are included in amounts of 100 parts by weight of (a) water-soluble cellulose ether starting powder, from 30 to 150 parts by weight of (b) water-insoluble cellulose particle starting powder and from 300 to 1,000 parts by weight of (c) water.

13. The cellulose composition production method of claim 9, wherein the cellulose composition includes water-insoluble cellulose particles having a volume-based mean particle size as measured by wet laser diffraction of from 0.017 to 200 µm.

14. The cellulose composition production method of claim 9, wherein the volume fraction in the cellulose composition of water-insoluble cellulose particles having an effective particle size as determined by wet laser diffraction of from 0.017 to 1 µm is at least 0.3%.

* * * * *